(12) United States Patent
Lin et al.

(10) Patent No.: US 9,758,074 B1
(45) Date of Patent: Sep. 12, 2017

(54) PAWL AND SECTOR LOCKING ADJUSTABLE ARMREST

(71) Applicants: Steve Lin, Northville, MI (US); Edward Poulos, Grosse Ile, MI (US); Sobieslaw Derbis, Auburn Hills, MI (US)

(72) Inventors: Steve Lin, Northville, MI (US); Edward Poulos, Grosse Ile, MI (US); Sobieslaw Derbis, Auburn Hills, MI (US)

(73) Assignee: Porter Systems Inc., Novi, MI (US)

( * ) Notice: Subject to any disclaimer, the term of this patent is extended or adjusted under 35 U.S.C. 154(b) by 0 days.

(21) Appl. No.: 15/283,784

(22) Filed: Oct. 3, 2016

(51) Int. Cl.
   *B60N 2/44*  (2006.01)
   *B60N 2/46*  (2006.01)

(52) U.S. Cl.
   CPC ......... *B60N 2/4435* (2013.01); *B60N 2/4633* (2013.01)

(58) Field of Classification Search
   CPC ............................ B60N 2/4435; B60N 2/4633

USPC .................................................. 297/411.32
   See application file for complete search history.

(56) References Cited

U.S. PATENT DOCUMENTS

| | | | | |
|---|---|---|---|---|
| 5,597,209 A * | 1/1997 | Bart | ...................... | B60N 2/4633 297/411.32 |
| 5,702,157 A * | 12/1997 | Hurite | .................. | B60N 2/4633 297/411.32 |
| 2002/0096928 A1 * | 7/2002 | Bidare | ................. | B60N 2/4633 297/411.32 |
| 2009/0309407 A1 * | 12/2009 | Saito | ...................... | A47C 7/543 297/411.32 |

* cited by examiner

*Primary Examiner* — Anthony D Barfield
(74) *Attorney, Agent, or Firm* — Thomas P. Hard

(57) ABSTRACT

The present invention is a simplified pawl and sector adjustable armrest device. Both the pawl and sector have a toothed edge, which engage one another in the locked position. The locked position prevents the armrest from rotating. A pawl-return torsional spring maintains engagement between the pawl and sector. A release cable can disengage the pawl from the sector, unlocking the adjustable armrest, allowing it to rotate in either position. A protrusion from the sector limits the rotation by butting up against a built-in stop.

13 Claims, 7 Drawing Sheets

PAWL AND SECTOR LOCKING ADJUSTABLE ARMREST

FIELD OF INVENTION

This invention relates to the classification of chairs and seats, and to one or more sub-classifications under armrests. Specifically, this invention is an adjustable armrest for an automobile.

BACKGROUND OF INVENTION

Most minivans and sport utility vehicles ("SUV") use a standalone, raised version of the bucket seat called a captain's seat. For comfort, as well as accessibility, captain's seats usually have adjustable armrests. These armrests are typically mounted into the frame of the seatback. Adjustable armrests usually have a mechanism that allow it to be rotated into a use position or a stowed position, often rotating through 120° or more. In the use position, a driver or passenger rests his or her arm on the armrest. In the use position, the armrest will be substantially horizontal with some variation based on the actual user's preferences. In the stowed position, the adjustable armrest typically is parallel to the seatback in a substantially vertical position.

Drivers and passengers often lean on the adjustable armrest, or use it as leverage to get into or out of the vehicle. Additionally, while driving, many drivers tend to lean on the armrest as the primary support for their upper body. As a result, the adjustable armrest has to handle a substantial, sustained load in the horizontal position, while being easily rotatable into a substantially vertical position.

The global automotive market is exceptionally competitive, meaning that automotive manufacturers are constantly striving for the seemingly contradictory goals of improved features, less expense, lighter weight, and greater durability. As a result, adjustable armrests not only need to be able to support a substantial load, but also be inexpensive, lightweight, and durable. Moreover, because of how they are used, adjustable armrests have to pay special attention to both kinetic and static loading requirements.

PRIOR ART REVIEW

There is clearly a market demand for a mechanically simple, lightweight, inexpensive, reliable and easy-to-use adjustable armrest. The recent prior art illustrates many different examples and strategies to provide such a solution, all of which fail in some aspect. For example, U.S. Utility Pat. No. 6,467,847, by named inventor Bidare, entitled, "Comfort armrest with memory" ("Bidare '847") teaches an armrest with memory, and a "down" storage position. Bidare '847 uses a pawl and sector with a control rod, and is very complex. Bidare '847 has a peripheral raised portion that likely does not wear well in harsh automotive environments. The raised portion would also tend to fail more often than other solutions to this problem.

U.S. Utility Pat. No. 8,702,174, by named inventor Pacolt, entitled, "Armrest exhibiting multiple stacked and fixed sectors in alignment with retractable pawls and exhibiting offset engaging teeth for ensuring incremental pivotal adjustability" ("Pacolt '174") teaches an adjustable armrest with multiple, stacked, sector and pawl assemblies. Clearly, Pacolt '174 is needlessly complex, in that it has redundant parts. Instead of allowing one pawl and sector assembly to adjust to many different positions, Pacolt '174 uses multiple, stacked assemblies. Its complexity leads to concerns regarding robustness, weight, and cost.

U.S. Utility Pat. No. 4,978,171, by named inventor Tateyama, entitled, "Vehicle armrest positioning assembly" ("Tateyama '171") teaches an arm rest device for use with a vehicular seat. Tateyama '171 teaches using a toothed sector with a pawl having a single tooth or point. Tateyama '171 uses a spring in-line with a release cable in order to keep the pawl and sector engaged. Such an in-line spring or biasing means is not a robust solution.

U.S. Utility Pat. No. 7,484,810, by named inventors Yamane, et. al., entitled, "Armrest apparatus" ("Yamane '810") teaches an armrest that is incrementally adjustable in one direction of rotation from the horizontal, until it reaches a pre-determined position, at which point the armrest can be restored to a horizontal position. Yamane '810 uses a drum and cam assembly to accomplish this. Yamane '810 is needlessly complex and can irritate users at times. If a user over-adjusts the armrest, the user must raise the armrest almost completely to the vertical and start the adjustment process all over, beginning at the horizontal position. The market is looking for an adjustable armrest mechanism that is inexpensive, lightweight, and robust.

SUMMARY OF THE INVENTION

This summary is intended to disclose the present invention, a simplified pawl and sector locking adjustable armrest device. The embodiments and descriptions are used to illustrate the invention and its utility, and are not intended to limit the invention or its use.

The present invention relates to using a simplified pawl and sector mechanism to adjust, and lock, and armrest in a desired place. The present invention allows the armrest to be adjusted, incrementally, to multiple positions between substantially horizontal and substantially vertical. The present invention allows the armrest to be adjust both towards the horizontal and towards the vertical from any position. The present invention is simple, lightweight, and robust.

The present invention uses a pawl and sector. The pawl is a spring-loaded member with a substantially flat surface that has a short toothed edge facing the sector. The sector has an opposing toothed edge facing the pawl. The toothed edge of the sector is the perimeter of a sectional piece of a circular disk. The sector also has a protrusion that acts as a stop.

The sector is attached to the rotational axle of an armrest frame, with a sector-return torsional spring interposed between the sector and the armrest frame. The sector-return torsional spring biases the sector so that its protrusion hits the stop. The sector-return torsional spring can be a coil spring or a leaf spring. In the illustrated embodiment, the sector-return torsional spring is a coil spring with two tangs. One tang engages the armrest frame, preventing the sector-return torsional spring from rotating. The other tang engages the sector, biasing it so that its protrusion hits the stop. The toothed edge of the sector engages with, and locks against, the toothed edge of the pawl.

The pawl can pivot around an axis separate and apart from the sector. A pawl-return torsional spring is attached to the pawl, in order to keep the pawl engaged with the sector. The pawl-return torsional spring can be a coil spring or leaf spring. Both embodiments are illustrated herein.

A release cable is attached to the pawl. The other end of the release cable attaches to an actuation lever. The actuation lever has a long member and a short member, both of which are orthogonal to a pivot pin, about which the actuation lever can rotate. The release cable is attached to the short member.

When a spring-loaded lever actuation cylinder is depressed, it presses on the long member, rotating the actuation lever. This causes the short member to rotate away from the pawl and the release cable to disengage the toothed edge of the pawl from the toothed edge of the sector. In this unlocked position, the armrest can be rotated in either direction.

A cover frame encloses the assembly within the armrest frame. The cover frame and armrest frame can be fabricated from one or more of the following: steel, aluminum, zinc, magnesium, poly(methyl-methacrylate) ("PMMA"), polyamide ("PA"); polycarbonate ("PC"), acrylonitrile butadiene styrene ("ABS"), polypropylene ("PP"), high-density polyethylene ("HDPE"), and low-density polyethylene ("LDPE"). The sector and pawl are typically metal parts, constructed from steel, although they can be fabricated from plastic. Currently, structural plastics do not make for robust sectors and pawls, due to loading and wear considerations. The sector-return torsional spring and the pawl-return torsional spring are both fabricated from spring steel. The actuation lever can be metal or plastic.

BRIEF DESCRIPTION OF THE DRAWINGS

The present invention is illustrated with 7 drawings on 7 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, a pawl and sector locking adjustable armrest device 1. While embodiments of the invention are illustrated and described, the embodiments herein do not represent all possible forms of the invention. Rather, the descriptions, illustrations, and embodiments are intended to teach and inform without limiting the scope of the invention.

Figure 5:
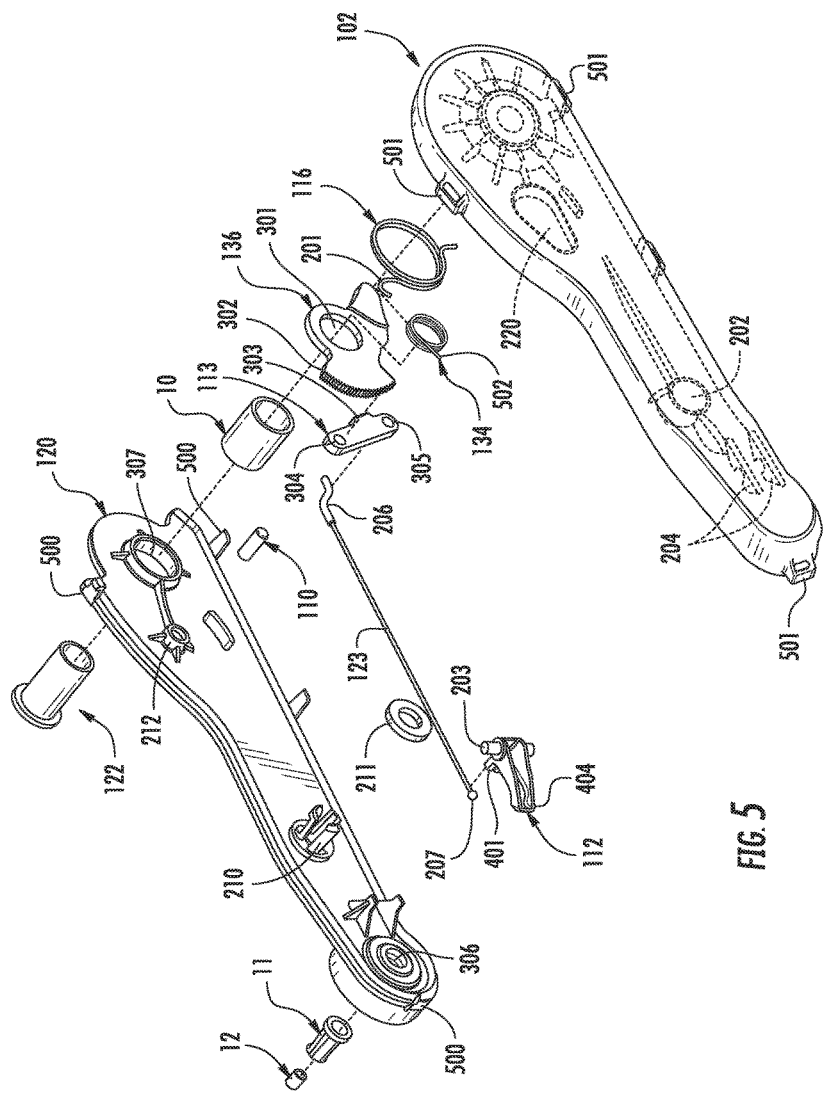
FIG. 5 is an exploded isometric view of the present invention.

FIG. 5 is an exploded isometric view of the present invention, a simplified pawl and sector adjustable locking armrest 1. An armrest frame 102 and a cover frame 120 oppose one another. The armrest frame 102 and cover frame 120 can both be fabricated from one or more of the following: steel, aluminum, zinc, magnesium, poly(methyl-methacrylate) ("PMMA"), polyamide ("PA"); polycarbonate ("PC"), acrylonitrile butadiene styrene ("ABS"), polypropylene ("PP"), high-density polyethylene ("HDPE"), and low-density polyethylene ("LDPE"). A plurality of snap-fit fasteners 210, 500 on the cover frame 120 fit into a plurality of snap-fit receptacles 202, 501 on the armrest frame 102. An annular spacer 211 fits between the snap-fit fastener 210 and the snap-fit receptacle 202. A press fit bushing 10 is press fitted into a hole 300 in the armrest frame 102. A flanged pivot tube 122 fits through a hole 307 in the cover frame 120. The flanged pivot tube 122 fits inside the press fit bushing 10, allowing the armrest frame 102 and the cover frame 120 to rotate about a common pivot point 122, 10.

The hole 301 in a sector 136 fits over the press fit bushing 10. A sector-return torsion spring 116 also fits over the bushing 10, between the sector 136 and the armrest frame 102. The sector-return torsion spring 116 has a tang 201 that engages the sector 116. The sector 116 has a toothed edge 302.

A pawl 113 has a toothed edge 303 which engages with the toothed edge 302 of the sector 116, locking the armrest. The pawl 113 has two holes 304, 305. The upper hole 304 allows the pawl 113 to pivot about a pin 110. The pin 110 fits into a fitting 212 in the cover frame 120. The lower hole 305 attaches the pawl 113 to a release cable 123.

At one end, the release cable 123 has a fitting 206 that engages with the lower hole 305 of the pawl 113. At the other end, the release cable 123 has a fitting 207 that engages an actuation lever 112.

The actuation lever 112 has a pivot pin 203. The actuation lever 112 pivot pin 203 fits into a molded fitting 204 in the armrest frame 102. The actuation lever 112 has a short member 401 and a long member 404. The release cable 123 fitting 207 engages the short member 401 of the actuation lever 112. The actuation lever 112 can pivot about the pivot pin 203 when fitted in the molded fitting 204 in the armrest frame 102.

A lever actuation cylinder 11 and a spring pin release 12 fit through a hole 306 in the cover frame 120. The pawl and sector locking adjustable armrest 1 is unlocked by depressing the lever actuation cylinder 11. When depressed, the lever actuation cylinder 11 contacts the long member 404 of the actuation lever 112, moving the long member 404 towards the armrest frame 102. The movement of the long member 404 rotates the actuation lever 112 about the pivot pin 203, moving the short member 401 away from the pawl 113. The cable 123 attaching the short member 401 and the pawl 113 disengages the pawl 113 from the sector 136. In the unlocked position, the pawl and sector locking adjustable armrest 1 can be rotated about the pivot tube 122.

Figure 1:
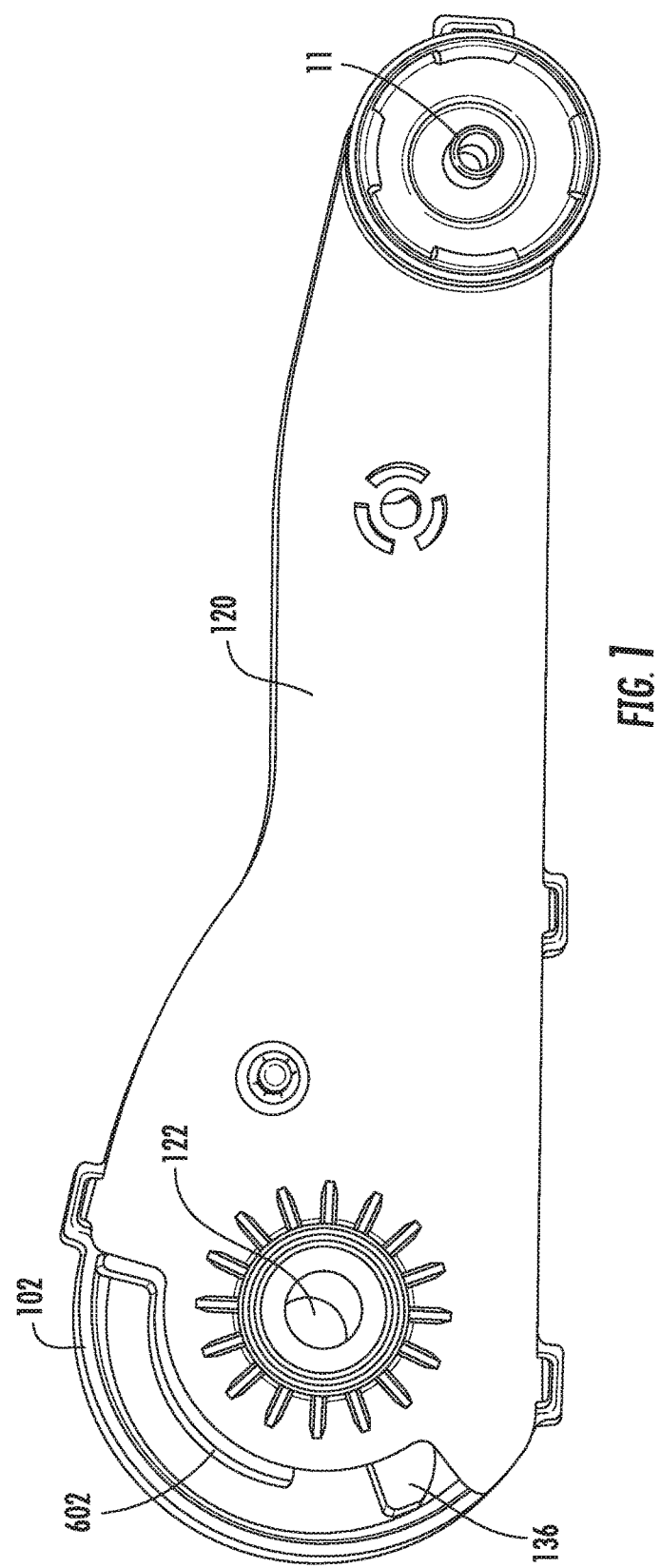
FIG. 1 is a lateral view of the present invention, a simplified pawl and sector adjustable locking armrest.
Figure 3:
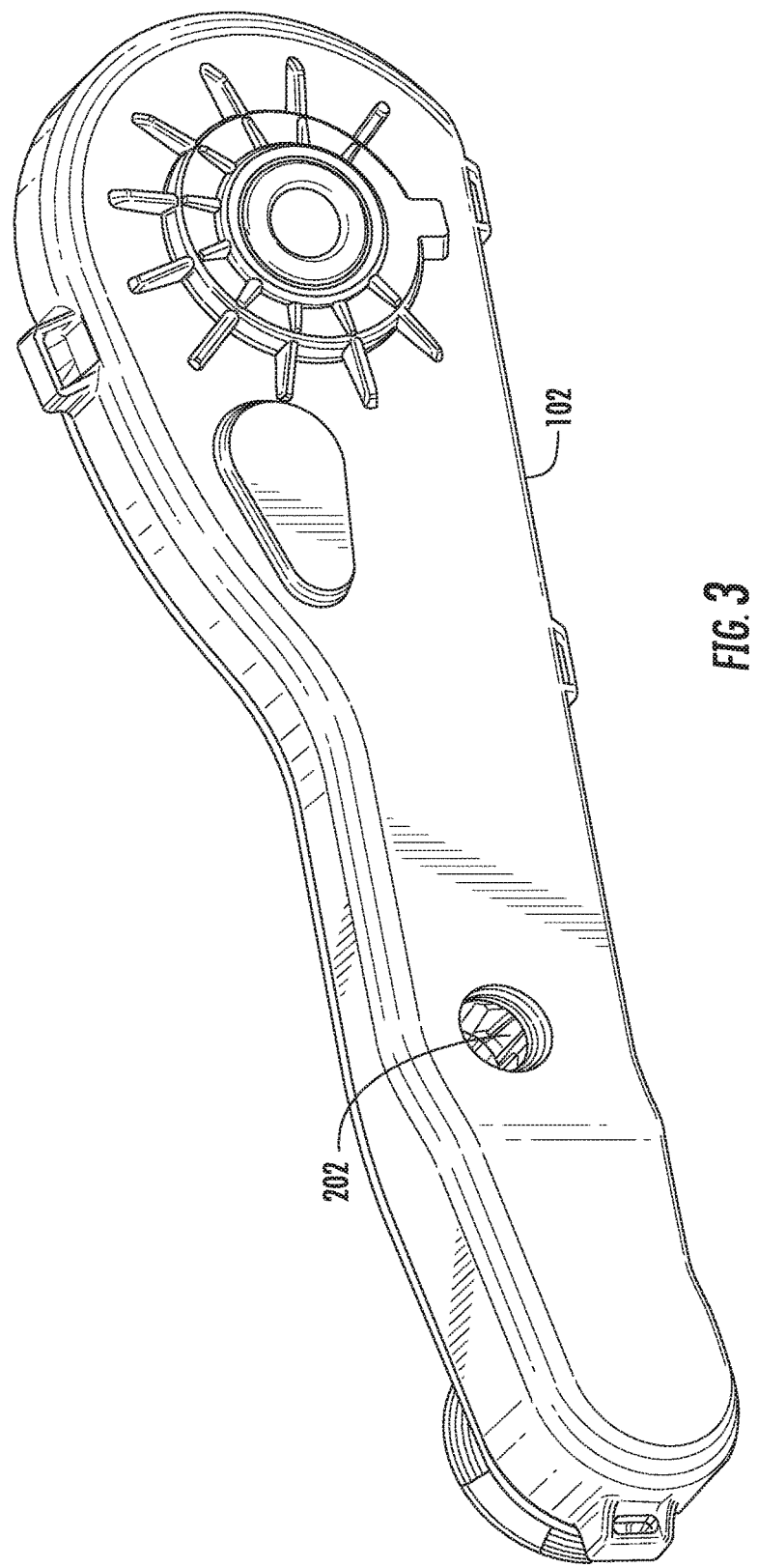
FIG. 3 is a reversed lateral view of the present invention (a reverse lateral angle with respect to FIG. 1).

FIG. 1 shows a lateral view of the armrest frame 102 mated to the cover frame 120. A portion of the sector 136 and the pivot tube 122 are also visible. FIG. 3 shows a reverse lateral view of the armrest frame 102 mated to the cover frame 120, in which the cover frame 120 is obscured in this view.

Figure 2:
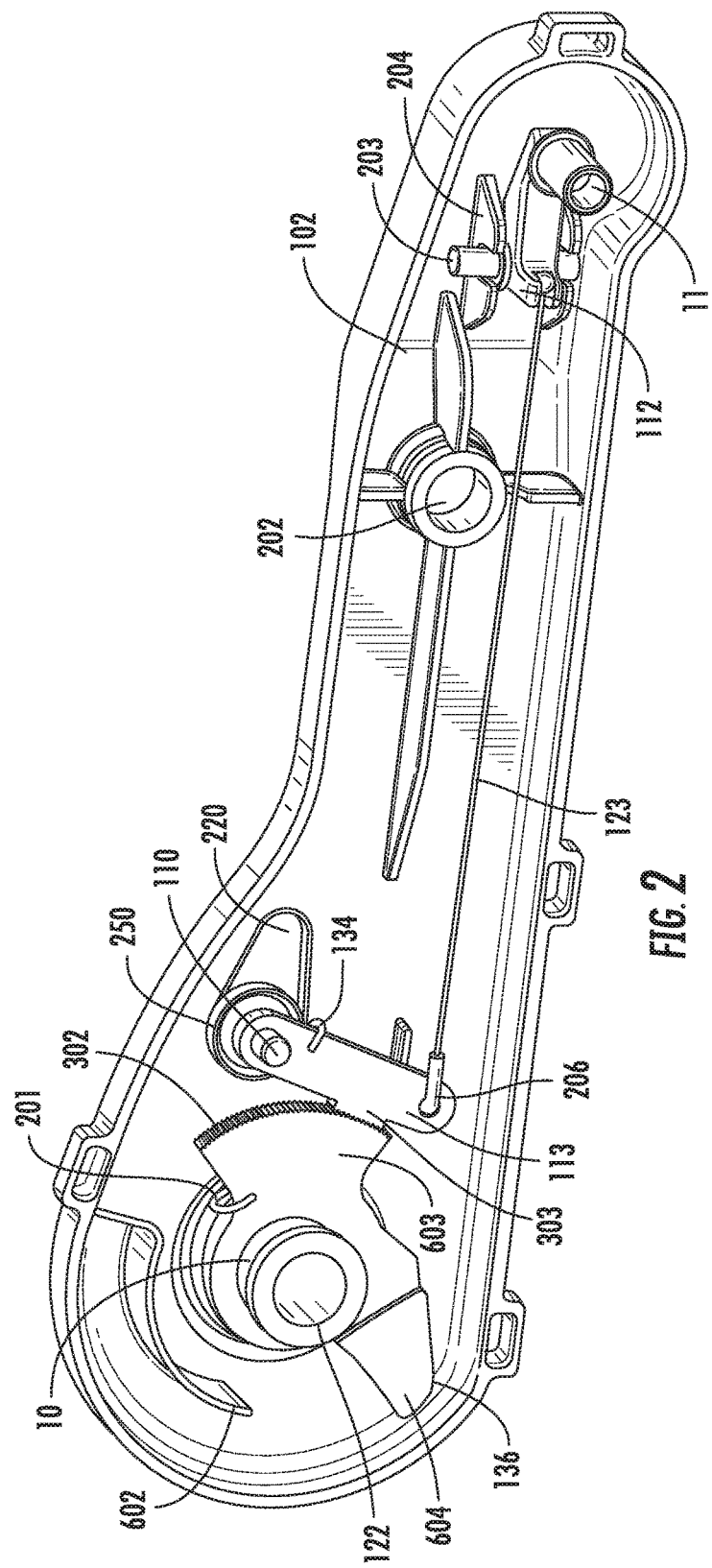
FIG. 2 is a lateral view of the present invention, a simplified pawl and sector adjustable locking armrest, with the cover frame removed.

In FIG. 2, the inside of the mechanism is shown, in situ, in the armrest frame 102. The sector 136 pivots about the bushing 10 and pivot tube 122. The sector 136 has a sector-return torsion spring 116 of which the tang 201 is visible. The sector 136 has a toothed edge 302 that engages with a toothed edge 303 of the pawl 113. The toothed edge 302 of the sector 136 are on a sectional region of a disk 603. The sector 136 has a protrusion 604 that prevents the sector 136 from rotating past a stop 602 molded into the armrest frame 102. The pawl 113 can pivot around a pivot pin 110 held in place, on the armrest-frame 102 side, by a retainer disk 250. The retainer disk 250 fits within an opening 220 in the armrest frame 102. The release cable 123 is attached to the pawl 113 with a fitting 206. The snap-fit receptacle 202 in the armrest frame 102 is visible. The pivot pin 203 holds the actuation lever 112 in place by mating with the molded fitting 204 in the armrest frame 102. This allows the actuation lever 112 to pivot about the pivot pin 203 when the lever actuation cylinder 11 is depressed, pulling the release cable 123 and releasing the pawl 113.

Figure 4:
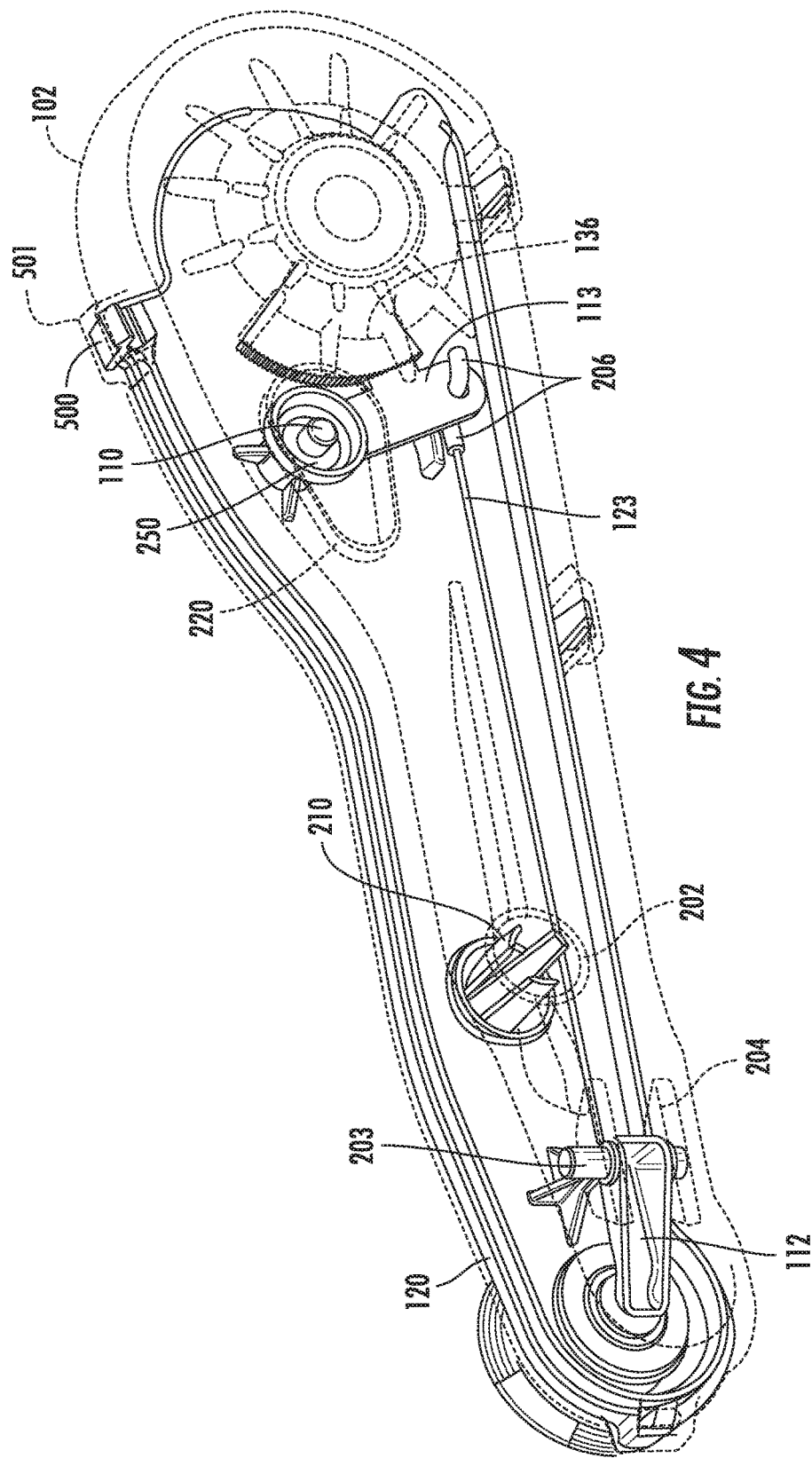
FIG. 4 is a partially transparent lateral view of the present invention.

In FIG. 4, the present invention 1, a pawl and sector locking adjustable armrest device 1 is shown with the armrest frame 102 as dotted lines, so that the internal components can be seen. The armrest frame 102 is held to the cover frame 120 with a plurality of snap-fit fasteners 210, 500 that fits into a plurality of snap-fit receptacles 202, 501 on the armrest frame 102. The actuation lever 112 is held in place by the pivot pin 203 that mates with the molded fitting 204. The release cable 123 is connected to the pawl 113 with a fitting 206. The pawl 113 engages the sector 136 in the locked position. The pawl 113 pivots about a pivot pin 110 held in place with a retainer disk 250. The retainer disk 250 fits within the opening 220 in the armrest frame 102.

Figure 6:
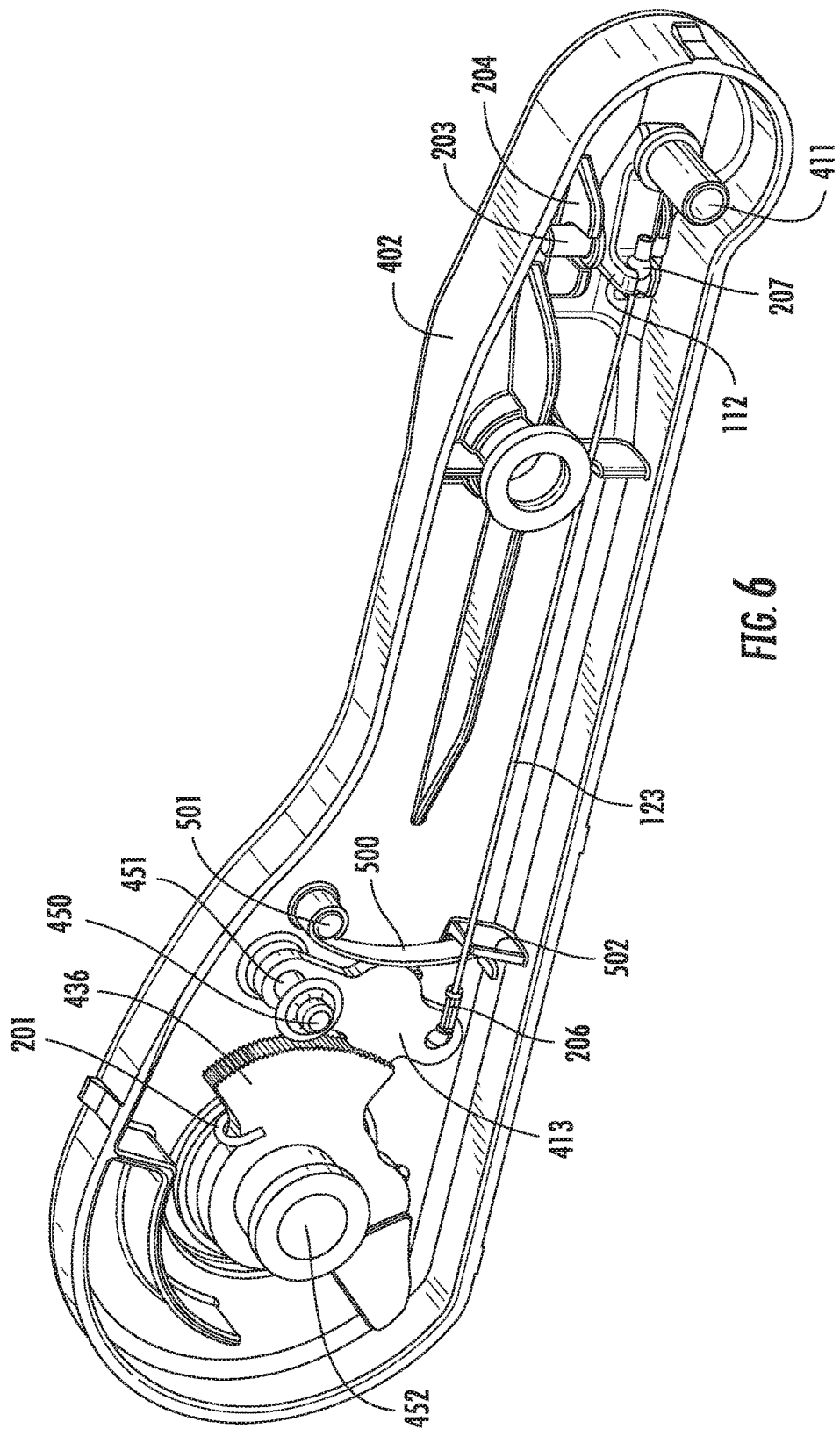
FIG. 6 is an isometric lateral view of an alternative embodiment of the present invention.
Figure 7:
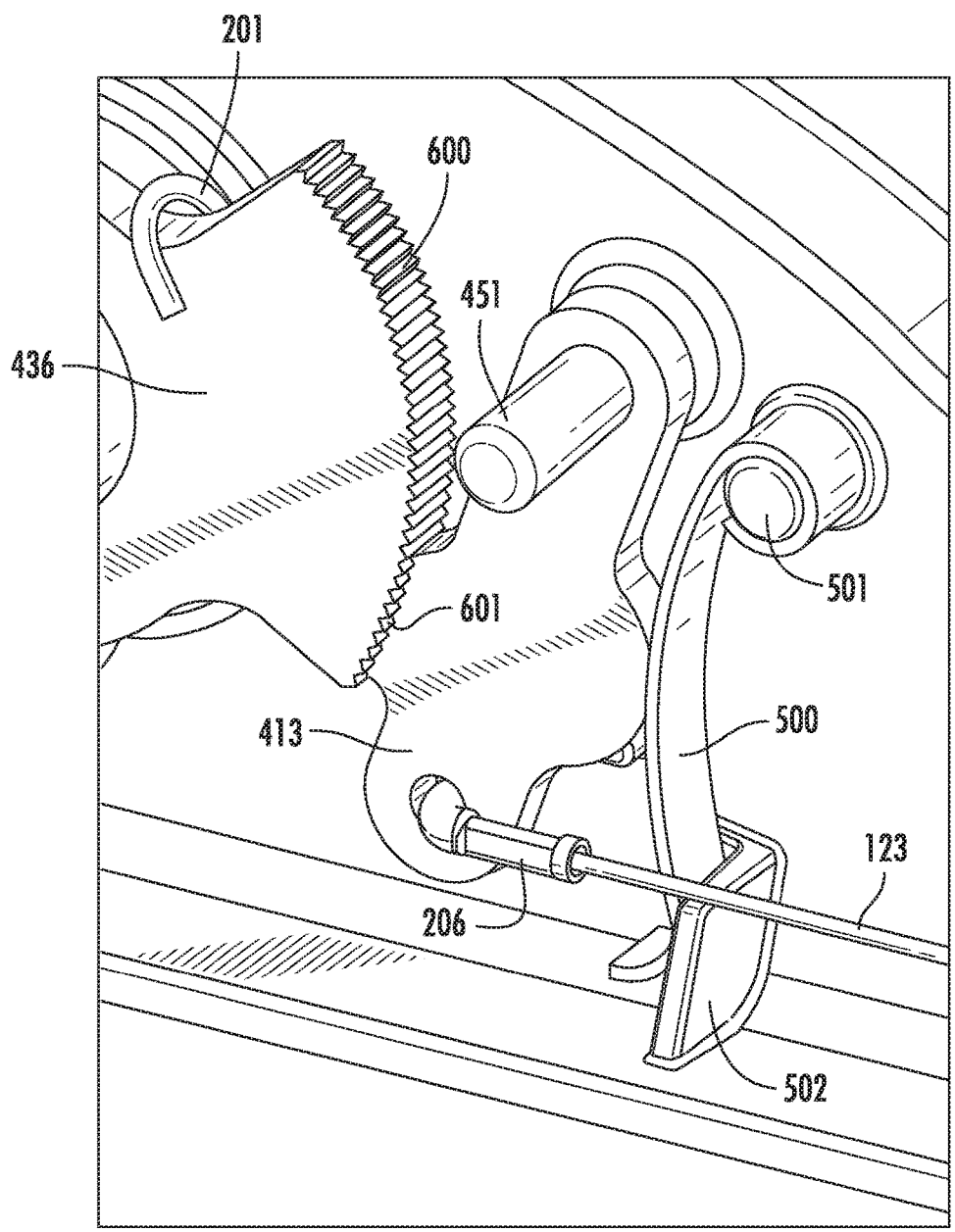
FIG. 7 is a lateral isolation of the pawl and sector of the alternative embodiment.

FIGS. 6 and 7 show an alternative embodiment of the present invention 1, a pawl and sector locking adjustable armrest device 1. A sector 436 is mounted on a pivot tube 452, with the pivot tube 452 being attached to the armrest frame 402. A sector-return torsion spring has a tang 201 that engages the sector 436. The toothed edge 600 of the sector 436 engages the toothed edge 601 of the pawl 413. The pawl 413 pivots about a pivot pin 451. The pawl 413 is held in place on the pivot pin 451 with a pivot pin retainer 450. A pawl-return torsion spring 500 is mounted on a post 501 molded into the armrest frame 402. In this configuration, the pawl-return torsion spring 500 is a leaf spring. A leaf spring 500 is a slender arc-shaped length of spring steel of rectangular cross-section. The pawl-return torsion spring 500 is biased towards the pawl 413, keeping the pawl 413 and sector 436 locked together. The pawl-return torsion spring 500 terminates against a feature 502 molded into the armrest frame 402. The release cable 123 is connected to the pawl 413 with a fitting 206. An actuation lever 112 is held in place with pivot pins 203 that engage with the molded fitting 204. The release cable 123 is retained by the actuation lever 112 with a fitting 207. A lever actuation cylinder 411 engages the actuation lever 112, releasing the pawl 413, as before.

The cover frame 120 can be fabricated from at least one of the following: steel, aluminum, zinc, magnesium, poly (methyl-methacrylate) ("PMMA"), polyamide ("PA"), polycarbonate ("PC"), acrylonitrile butadiene styrene ("ABS"), polypropylene ("PP"), high-density polyethylene ("HDPE"), and low-density polyethylene ("LDPE"). The armrest frame 102 can be fabricated from at least one of the following: steel, aluminum, zinc, magnesium, poly(methyl-methacrylate) ("PMMA"), polyamide ("PA"), polycarbonate ("PC"), acrylonitrile butadiene styrene ("ABS"), polypropylene ("PP"), high-density polyethylene ("HDPE"), and low-density polyethylene ("LDPE").

We claim:

1. A pawl and sector locking adjustable armrest device comprising an armrest frame;
    a sector with a toothed edge and an opening;
    a sector-return torsion spring, interposed between the sector and the armrest frame, wherein the sector-return torsion spring has a tang that engages the sector and a separate tang that engages the armrest frame;
    a bushing that fits inside the sector opening;
    a flanged pivot tube that fits inside of the sector, bushing, and sector-return torsion spring, wherein the flanged pivot tube mates with, and is durably attached to, the armrest frame;
    a pawl with a toothed edge that engages the toothed edge of the sector, wherein the pawl has at least two holes;
    a pawl pivot pin, fixed relative to the armrest frame, wherein the pawl pivot pin fits through one of the holes in the pawl, allowing the pawl to pivot with respect to the sector;
    a pawl-return torsion spring that is exerts force on the pawl such that the toothed edge of the pawl engages the toothed edge of the sector;
    an actuation lever;
    a spring-loaded lever actuation cylinder, in intimate contact with the actuation lever;
    a release cable, having two ends, each end having a fitting; wherein one end of the release cable is attached to the hole in the pawl that is not used by the pivot pin;
    wherein the second end of the release cable is attached to the actuation lever; and
    wherein depressing the lever actuation cylinder disengages the pawl from the sector, allowing the device to pivot about the pivot tube.

2. The pawl and sector locking adjustable armrest device of claim 1, further comprising a cover frame.

3. The pawl and sector locking adjustable armrest device of claim 2, wherein releasing the lever actuation cylinder results in the pawl-return torsion spring forcing the toothed edge of the pawl to re-engage with the toothed-edge of the sector, thereby locking the device in position.

4. The pawl and sector locking adjustable armrest device of claim 3, wherein the sector-return torsion spring is a coil spring.

5. The pawl and sector locking adjustable armrest device of claim 3, wherein the pawl-return torsion spring is a coil spring.

6. The pawl and sector locking adjustable armrest device of claim 3, wherein the sector-return torsion spring is a leaf spring.

7. The pawl and sector locking adjustable armrest device of claim 3, wherein the pawl-return torsion spring is a leaf spring.

8. The pawl and sector locking adjustable armrest device of claim 3, wherein the actuation lever has a long member, a short member, and a pivot pin.

9. The pawl and sector locking adjustable armrest device of claim 8, wherein the long member and the short member are orthogonal to the pivot pin.

10. The pawl and sector locking adjustable armrest device of claim 9, wherein the lever actuation cylinder is in intimate contact with the long member; and the release cable is attached to the short member.

11. The pawl and sector locking adjustable armrest device of claim 10, wherein the pivot pin is captured by a feature in the armrest frame, said feature holding the pivot pin in place, but allowing the pivot pin to rotate.

12. The pawl and sector locking adjustable armrest device of claim 2, wherein the armrest frame is fabricated from at least one of steel, aluminum, zinc, magnesium, poly(methyl-methacrylate) ("PMMA"), polyamide ("PA"), polycarbonate ("PC"), acrylonitrile butadiene styrene ("ABS"), polypropylene ("PP"), high-density polyethylene ("HDPE"), and low-density polyethylene ("LDPE").

13. The pawl and sector locking adjustable armrest device of claim 12, wherein the cover frame is fabricated from at least one of steel, aluminum, zinc, magnesium, poly(methyl-methacrylate) ("PMMA"), polyamide ("PA"), polycarbonate ("PC"), acrylonitrile butadiene styrene ("ABS"), polypropylene ("PP"), high-density polyethylene ("HDPE"), and low-density polyethylene ("LDPE").

* * * * *